(12) United States Patent
Norwood et al.

(10) Patent No.: US 11,093,749 B2
(45) Date of Patent: Aug. 17, 2021

(54) ANALYSIS AND FEEDBACK SYSTEM FOR PERSONAL CARE ROUTINES

(71) Applicant: L'Oreal, Paris (FR)

(72) Inventors: Kelsey Norwood, Scotch Plains, NJ (US); Elisabeth Araujo, New York, NY (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 16/228,263

(22) Filed: Dec. 20, 2018

(65) Prior Publication Data

US 2020/0202131 A1 Jun. 25, 2020

(51) Int. Cl.
| | |
|---|---|
| *G06K 9/00* | (2006.01) |
| *H04N 7/18* | (2006.01) |
| *G06K 7/10* | (2006.01) |
| *G06K 7/14* | (2006.01) |
| *G09B 19/00* | (2006.01) |

(52) U.S. Cl.
CPC ..... *G06K 9/00718* (2013.01); *G06K 7/10722* (2013.01); *G06K 7/1413* (2013.01); *G06K 7/1417* (2013.01); *G06K 9/00335* (2013.01); *G09B 19/00* (2013.01); *H04N 7/183* (2013.01)

(58) Field of Classification Search
CPC .......... G06K 9/00718; G06K 7/10722; G06K 7/1413; G06K 7/1417; G06K 9/00335; G09B 19/00; H04N 7/183
See application file for complete search history.

(56) References Cited

U.S. PATENT DOCUMENTS

| | | |
|---|---|---|
| 7,068,842 B2 | 6/2006 | Liang et al. |
| 7,742,650 B2 | 6/2010 | Xu et al. |
| 8,300,924 B2 | 10/2012 | Eaton et al. |
| 8,478,048 B2 | 7/2013 | Ding et al. |
| 8,548,203 B2 | 10/2013 | Bobbitt et al. |
| 8,610,766 B2 | 12/2013 | Ding et al. |
| 8,761,451 B2 | 6/2014 | Bobbitt et al. |
| 8,761,517 B2 | 6/2014 | Ding et al. |

(Continued)

FOREIGN PATENT DOCUMENTS

| | | | |
|---|---|---|---|
| FR | 3023110 A1 | 6/2014 | |
| WO | WO-2016001248 A1 * | 1/2016 | ............. G16H 30/20 |

OTHER PUBLICATIONS

International Search Report and Written Opinion, dated Mar. 5, 2020, issued in corresponding International Application No. PCT/US2019/066756, filed Dec. 17, 2019, 11 pages.

*Primary Examiner* — Tsion B Owens
(74) *Attorney, Agent, or Firm* — Christensen O'Connor Johnson Kindness PLLC

(57) ABSTRACT

A computer system obtains digital video data of at least one physical consumer product (e.g., two or more cosmetics products) in a personal care routine; analyzes the digital video data (e.g., using automated object recognition or gesture recognition techniques); detects at least one physical interaction with the at least one physical consumer product (e.g., two or more applications of cosmetics products) based at least in part on the analysis of the digital video data; and causes customized personal care routine data (e.g., a computer animation simulation or a comparison of the user's routine with routines of other users) to be presented in a user interface. The customized personal care routine data is based at least in part on the at least one physical interaction.

19 Claims, 5 Drawing Sheets

(56) References Cited

U.S. PATENT DOCUMENTS

| | | | |
|---|---|---|---|
| 8,948,499 B1 | 2/2015 | Medasani et al. | |
| 9,196,053 B1 | 11/2015 | Huber et al. | |
| 9,471,832 B2 | 10/2016 | Ding et al. | |
| 9,566,004 B1 | 2/2017 | Radwin et al. | |
| 9,692,838 B2* | 6/2017 | LeBeau | H04L 67/22 |
| 10,592,932 B2* | 3/2020 | Gu | G06Q 30/0271 |
| 10,789,526 B2* | 9/2020 | Wilson | G06N 3/0427 |
| 10,881,285 B2* | 1/2021 | Deane | A46B 15/0004 |
| 10,956,956 B2* | 3/2021 | Bhardwaj | G06Q 30/0631 |
| 2012/0223956 A1* | 9/2012 | Saito | G06T 19/00 |
| | | | 345/582 |
| 2016/0253713 A1* | 9/2016 | Aarabi | G06Q 30/0276 |
| | | | 705/14.67 |
| 2017/0024589 A1 | 1/2017 | Schumacher et al. | |
| 2017/0238692 A1 | 8/2017 | Sarubbo et al. | |
| 2019/0166980 A1* | 6/2019 | Huang | G06T 11/001 |
| 2019/0244274 A1* | 8/2019 | Chang | G06Q 30/0641 |

* cited by examiner

ANALYSIS AND FEEDBACK SYSTEM FOR PERSONAL CARE ROUTINES

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, in a computer-implemented method, a computer system obtains digital video data of at least one physical consumer product (e.g., two or more cosmetics products) in a personal care routine; analyzes the digital video data (e.g., using automated object recognition or gesture recognition techniques); detects at least one physical interaction (e.g., two or more applications of cosmetics products) with the at least one physical consumer product based at least in part on the analysis of the digital video data; and causes customized personal care routine data to be presented in a user interface (e.g., of a client computer system). The customized personal care routine data is based at least in part on the at least one physical interaction. In an embodiment, the step of causing the customized personal care routine data to be presented in the user interface comprises generating the customized personal care routine data based at least in part on the at least one physical interaction and transmitting the customized personal care routine data to a client computer system for presentation in the user interface.

In an embodiment, the method further comprises obtaining product information for the at least one physical consumer product, wherein the customized personal care routine data is further based on the product information. In such an embodiment, the product information may be extracted from a graphical code on the at least one physical consumer product.

In an embodiment, the method further comprises representing the at least one physical consumer product as an object in a personal care routine simulation engine; and representing the detected physical interaction as an interaction with the object in the personal care routine simulation engine. In such an embodiment, the customized personal care routine data may include a computer-animation simulation of a personal care routine generated by the personal care routine simulation engine.

In another aspect, a client computer system (e.g., a smartphone, tablet computer, or other suitable computing device or set of computing devices) comprises a camera; a processor; and computer-readable media having stored thereon instructions configured to cause the client computer system to perform steps comprising capturing digital video data of at least one physical consumer product (e.g., two or more cosmetics products) used in a personal care routine; obtaining customized personal care routine data (e.g., a computer-animation simulation of a care routine or a comparison of the user's routine with other users); and presenting the customized personal care routine data in a user interface of the client computer system. At least one physical interaction with the at least one physical consumer product (e.g., two or more applications of cosmetics products) is detected based at least in part on automated analysis of the digital video data (e.g., using object recognition techniques), and the customized personal care routine data is based at least in part on the at least one physical interaction. In an embodiment, obtaining the customized personal care routine data comprises transmitting the digital video data to a remote computer system and receiving the customized personal care routine data from the remote computer system, wherein the at least one physical interaction is detected by the remote computer system based at least in part on analysis of the digital video data performed by the remote computer system, and wherein the customized personal care routine data is generated by the remote computer system. In an embodiment, the instructions are further configured to cause the client computer system to capture a digital image of a graphical code on the at least one physical consumer product, or obtain product information from the at least one physical consumer product via short-range radio-frequency communication.

In an embodiment, a non-transitory computer-readable medium includes instructions configured to, when executed by one or more computing devices of a computer system, cause the computer system to perform any of the functions described herein, in any combination.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
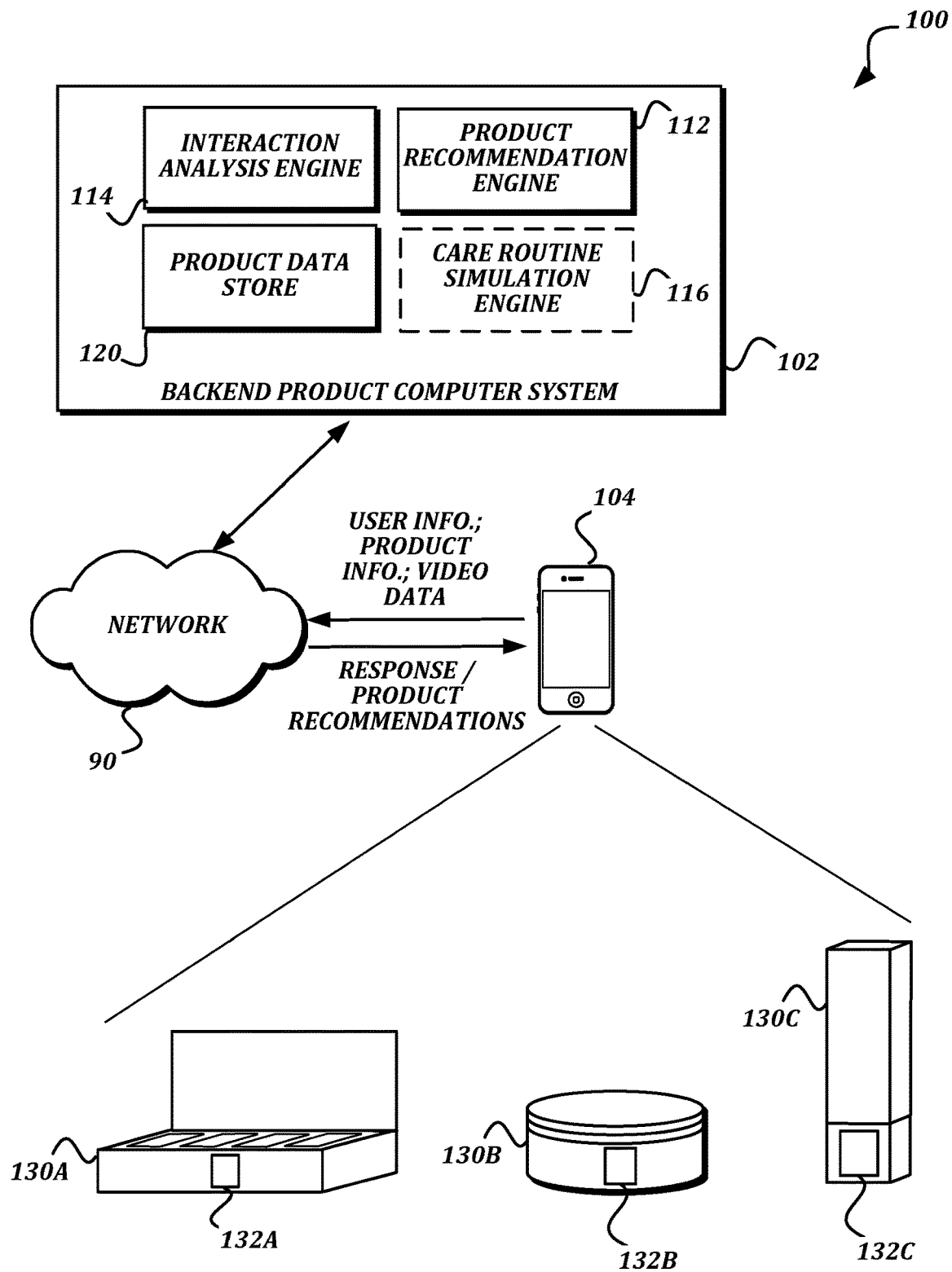
FIG. 1 is a schematic diagram that provides a high-level overview of a system in which various embodiments of the present disclosure may be implemented.

Consumers often use many different consumer products in various ways in a daily personal care routine. For example, a consumer may apply several types of cosmetics and personal care products at home in order to prepare for her work day. The number of ways in which consumer products may be combined and used in a personal care routine is potentially unlimited. The possible variations in products and how they are used can result in substantial differences in the consumer's satisfaction and experience. Even if two consumers use the same set of personal care products, the order, amount, and time spent applying each product can vary dramatically from person to person. Although it is possible to provide consumers with tutorials on how to use products, it is far more difficult to learn whether a recommended process is being followed, or whether the recommended process is appropriate for an individual consumer.

To learn more about consumer routines, personal care companies will sometimes conduct surveys. However, these surveys often have limited utility. Although consumers are familiar with their own routines on a personal level, it is often difficult for consumers to accurately self-report their own routines to the level of detail that is necessary to evaluate those routines for possible improvements.

Consumer products companies will sometimes invite groups of consumers to participate in observation sessions so that the consumers' routines can be studied more carefully. However, these sessions are expensive to administer and inconvenient for the consumers as well as the companies that administer them. In addition, the artificial environment of the observation sessions can lead consumers to modify their behavior relative to their normal routine, which can defeat the purpose of the study.

Although some attempts have been made to address these problems with technology, significant technical problems remain. For example, observation sessions may involve, with the consumers' consent, digital video recordings and computerized data collection and analysis. However, while video recordings of consumer routines may be of some use to human researchers that review them, it is difficult to gather enough information in this way to draw useful conclusions about overall consumer preferences and behavior, because a human observer must observe reach video recording to interpret what the video recording shows.

Described embodiments overcome these drawbacks and offer numerous technical benefits. Described embodiments can be used to provide automated feedback on personal care routines, such as recommended steps in a makeup application process. Described embodiments also can be used to assist in matching a consumer with products that are appropriate for that consumer, thereby enhancing the consumer's experience. In described embodiments, customized information in the form of product recommendations, recommended routines, or other information may be provided to a user based on analysis of an uploaded video of the user's personal care routine. The video analysis may include machine learning or artificial intelligence techniques (e.g., template matching, edge detection and matching, feature extraction and matching, classification, artificial neural networks, deep learning architectures, genetic algorithms, or the like) to perform object recognition. The video analysis of personal care routines may be used to determine information such as products used, order of usage, duration of use for each product, and how the products are being used (e.g., gestures of use). These determinations and the resulting recommendations also may be guided by machine learning or artificial intelligence techniques.

Information provided by the user may include product information, personal information such as skin or hair attributes, satisfaction ratings for products and routines, or the like. Information provided by the user may be collected via a browser or a dedicated application executing on a computing device, and customized product information may be received by the same computing device or some other computing device. To further improve or enhance the customized product information, additional information relating to the user could also be used, such as technical analysis of one or more images of the user to measure or map wrinkles, pigmentation, etc., of the user's skin. Data regarding the user or the user's routine can be compared with other users, and the results of those comparisons may be provided to the user or stored for research purposes (e.g., to improve knowledge of consumer routines or inter-product compatibility).

The customized information provided to the user may include recommendations on changes to the user's routine, recommended products, or other feedback. The customized product information may be further based on additional information such as users' answers to questions about themselves, their routine, or the products they use. The customized product information, demographic comparisons, or other results may be shared by the user via a social network.

FIG. 1 is a block diagram that illustrates an example embodiment of a system according to various aspects of the present disclosure. As shown, a system 100 includes components that allow an end user to obtain customized information, such as customized personal care routine data involving personal care products. Customized information may be provided in the form of product recommendations, tutorial videos, personal care routine simulations, or other user experiences. Consumers can use the system 100 to obtain customized product information for personal care products that may be available in a variety of colors, textures, and the like. Non-limiting examples of such products include eye liners, lip glosses, lipsticks, makeup, and nail polish. Although some aspects are illustrated and described as relating to personal care products, in some embodiments, products other than personal care products may be processed by the system 100. Furthermore, although some aspects are illustrated and described as relating to a personal care routine, in some embodiments activities other than personal care routines may be processed by the system 100.

As shown, the system 100 includes a backend product computer system 102, and a client computing device 104 (e.g., a smart phone, tablet computer, etc.). Each of these components may communicate with each other via a network 90, which may include any suitable communication technology including but not limited to wired technologies such as DSL, Ethernet, fiber optic, USB, and Firewire; wireless technologies such as WiFi, WiMAX, 3G, 4G, LTE, and Bluetooth; and the Internet.

In some embodiments, the client computing device 104 may be used by a user to interact with other components of the system 100. In some embodiments, the client computing device 104 is a mobile computing device such as a smart phone or a tablet computing device. However, any other suitable type of computing device capable of performing functions described herein, including but not limited to a desktop computing device, a laptop computing device, and a smart watch, may be used.

In the example shown in FIG. 1, the backend product computer system 102 includes a product recommendation engine 112, an interaction analysis engine 114, a product data store 120, and an optional care routine simulation engine 116. In some embodiments, the product recommendation engine 112 receives product information from the product data store 120 along with information from the client computing device 104, and uses this information to generate product recommendations. For example, the client computing device 104 may provide product information obtained from a product (e.g., a cosmetics product such as lipstick, lip gloss, eye shadow, foundation, or the like), along with digital video of a personal care routine. The product recommendation engine 112 may, in response, use this information to develop or obtain customized information (e.g., makeup application process steps, recommended products, recommended shades or styles of a product, etc.) to provide to the client computing device 104. Output from the product recommendation engine 112 may be provided to the optional care routine simulation engine 116, which can generate computer-animation simulations of the user's care routine or a recommended care routine, or some other simulation.

Information about a product being used can be obtained in any suitable manner. For example, a user may be prompted during an initial setup phase to provide information about the products to be used in a personal care routine. The user can provide product information via any suitable method (e.g., voice commands, gestures, text, or the like).

In some embodiments, personal care products include graphical codes, radio-frequency identification (RFID) chips, or other means for encoding personal care products with information that can be decoded and used to generate customized product information. In such embodiments, the client computing device 104 or some other computing device may obtain product information by decoding information encoded on or in the product (e.g., in a graphical code such as a bar code or QR code, or in a near-field communication (NFC) or RFID chip). In the latter case, the client computing device 104 may include or be communicatively coupled to specialized hardware for short-range radio-frequency communication, such as an NFC transceiver or RFID reader.

FIG. 1 depicts an illustrative scenario in which a client computing device 104 is used to capture video of a personal care routine. In this illustrative scenario, a client application executing on the computing device 104 manages a process of recording the personal care routine, which involves application of three personal care products: eyeshadow 130A, foundation 130B, and lipstick 130C. The process may involve an initial setup in which the client application instructs the user to make basic preparations for recording. For example, the client application may instruct the user to position the camera so that all the products to be used are in the field of view of the camera. As another example, the client application may instruct the user to place the products in a particular arrangement (e.g., from the user's left to right), scan graphical codes or chips on the products, or otherwise obtain identifying information for the products, which can help the system identify the products correctly and follow what the user is doing during her routine. The client application may also provide other guidance, such as instructing the user to open containers and get brushes ready, remove extraneous objects from the field of view, or make other preparations to avoid unnecessary movements or other visual noise during recording. These steps can help the system by reducing the number of interactions to be interpreted by the system.

The video recording may be initiated by the user's interaction with the client application, such as by tapping a "record" button in a user interface, or issuing a voice command. The client computing device 104 can then upload the recorded video to the backend product computer system 102 for analysis.

The backend product computer system 102 can then process the uploaded video in the interaction analysis engine 114 in order to analyze the recorded routine. This analysis can be performed in different ways. For example, one or more object recognition techniques (e.g., template matching, edge matching, feature matching, artificial neural networks, deep learning architectures, genetic algorithms, or the like) can be used to detect which products the user is interacting with, and how they are being used. This task may be assisted by information obtained during the initial setup. For example, if the client computing device 104 scans a graphical code 132A on the eyeshadow 130A and extracts a corresponding product identifier, this identifier can be transmitted by the client computing device 104 to the backend product computer system 102 to be used in a subsequent lookup operation. In some embodiments, the backend product computer system 102 uses a product identifier received from the client computing device 104 to look up information about the product (e.g., color, shape, and size of the packaging) in the product data store 120. This lookup operation can be used to provide the interaction analysis engine 114 with a 2D or 3D model or description of the product and/or related objects (e.g., brushes, applicators, or the like) to assist in object recognition and detection of interactions with recognized objects. A similar process can be used for tracking other products or objects that are used in the care routine. Alternatively, products or objects can be recognized in the video in other ways, such as by assigning a particular location for specific products and instructing the user to keep those products in the assigned locations to enable the interaction analysis engine 114 to track their use.

Once the products in the video have been recognized, the interaction analysis engine 114 can detect physical interactions with those products that are performed during a personal care routine. In this way, the interaction analysis engine 114 can identify which products were used, the order in which the products were used, the number of times the products were used, and/or how the products were used. In some embodiments, the interaction analysis system distinguishes care routine interactions that will affect the end result of the care routine, such as applying a product to the user's face, from insignificant actions, such as simply touching or repositioning a product. For example, the interaction analysis system may use object recognition techniques to determine whether an object, such as a brush or applicator, is in the user's hand. The system may also use gesture recognition techniques (e.g., comparing detected hand movements to gesture models in 3D model-based, skeletal-based, or appearance-based recognition algorithms) to recognize specific gestures or other actions by the user (e.g., applying lipstick or makeup to the user's face).

Care routine interactions may be detected in different ways, depending on the product and the level of precision of detection that may be desired. For example, a lipstick application may be detected when the lipstick 130C is grasped and lifted to the user's face. This approach may be easier to implement than more precise gesture detection, but it may also introduce a risk of false positives if the user often grasps and lifts the lipstick without actually applying it to her face. If greater precision is desired, more detailed recognition of a care routine interaction may be used, such as by detecting a specific movement of lipstick on the user's face using gesture recognition techniques. As another example, an eyeshadow interaction or foundation interaction may be detected when a brush contacts a container of eyeshadow 130A or foundation 130B and is subsequently lifted to the user's face, indicating that the product was actually applied. In this way, the system can distinguish from other interactions, such as where a brush is simply placed on the table next to the container. If the user's face is not in the field of view, the system may detect an application when a brush or lipstick container is lifted out of the field of view. In this way, the system can detect care routine interactions even if the user's face is not in the field of view, as may be necessary due to privacy concerns or for technical reasons, such as where the camera must be placed close to the user's work area due to space limitations.

In the example shown in FIG. 1, the interaction analysis engine 114 provides descriptions or logs of the detected interactions of a personal care routine to the product recommendation engine 112 for further processing. In some embodiments, the product recommendation engine 112 compares the detected interactions with a recommended routine and provides customized product information, such as a suggested revision to the routine, to the user. The product recommendation engine 112 also may use other information (e.g., a user ID or a product identifier extracted from a graphical code) to obtain further information about the product or the user. This additional information may be used to generate additional customized product information, such as recommendations on whether particular colors or product types should be used in combination, or whether the products used in the care routine are appropriate for a user's skin type.

Consider an illustrative scenario in which the interaction analysis system 114 detects a personal care routine consisting of 1 lipstick application, followed by 2 eyeshadow applications, followed by 2 foundation applications. This information can be provided to the product recommendation engine 112, which compares the detected routine with a recommended routine of 5 foundation applications, followed by 2 eyeshadow applications, followed by 1 lipstick application. The recommended routine may be specific to the user (e.g., based on age, skin type, etc.), or a typical routine for a larger class of users. Based on the comparison, the product recommendation engine 112 determines that the user applied the products in the wrong order, and that the user did not use enough foundation.

Once this determination has been made, the product recommendation engine 112 can generate customized personal care routine data for the user, which may include tutorial videos showing a recommended routine; text, audio, or graphic descriptions of suggested changes to the routine; text, audio, video, or graphical advertisements for relevant products; or the like. An optional care routine simulation engine 116 can be used to generate customized personal care routine data in the form of, e.g., computer-animation simulations showing a recommended routine; side-by-side comparisons with simulations that compare the user's detected routine with the recommended routine; or the like.

Figure 2:
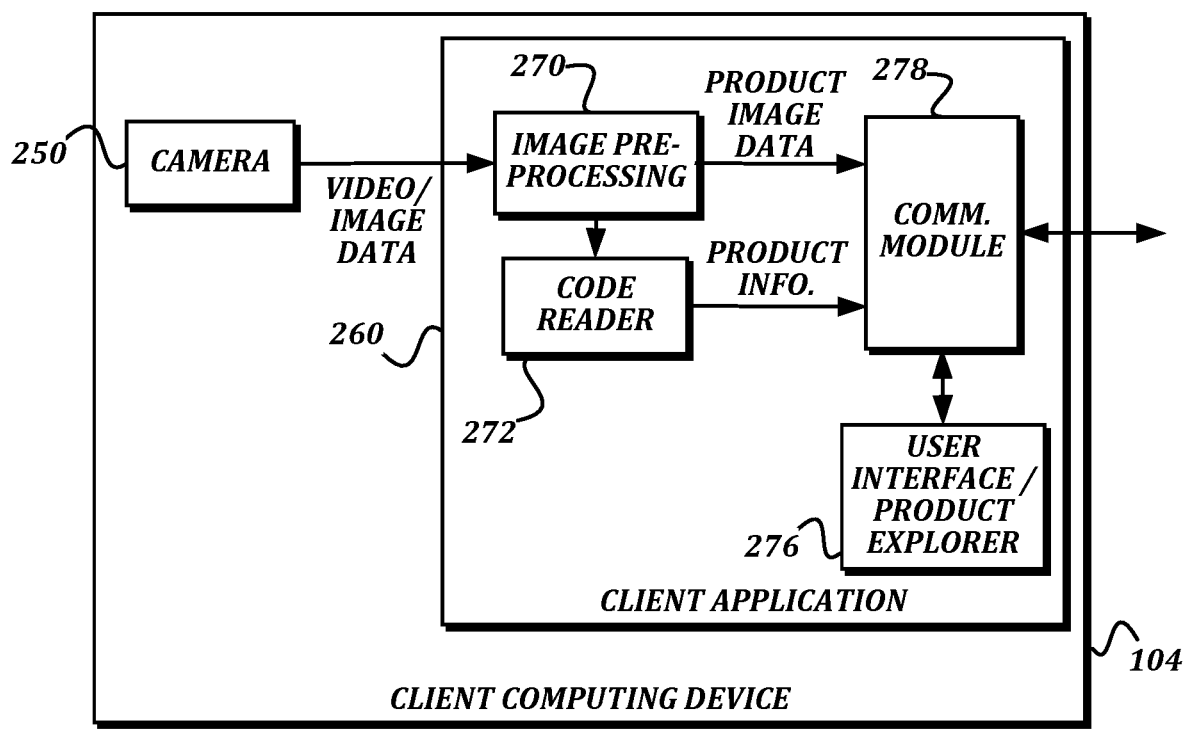
FIG. 2 is a block diagram that illustrates an example embodiment of a client computing device according to various aspects of the present disclosure.

FIG. 2 is a block diagram that illustrates an example embodiment of a client computing device 104 according to various aspects of the present disclosure. In the example shown in FIG. 2, the client computing device 104 includes a camera 250 and a client application 260. The client application 260 includes a user interface 276, which may include interactive functionality such as guides, tutorials, simulations, or product exploration technology. Product exploration technology may, in some embodiments, allow consumers to try different looks, perform color matching, compare products with other products, test variations in characteristics such as coverage, color, finish, etc. In an embodiment, the user interface and related technology is provided on a consumer's computing device (e.g., smart phone, tablet computer, etc.) Alternatively, described functionality can be provided on some other computing device, such as a device with a larger screen at a point of sale for cosmetics products.

In the example shown in FIG. 2, the client computing device 104 is configured to record video of a personal care routine and capture images of graphical codes (e.g., graphical codes 132A, 132B, 132C in FIG. 1) using the camera 250. The camera provides image data and video data to the client application 260, which performs image preprocessing 270 to determine how the image data should be processed. For example, the client application 260 may use image preprocessing 270 to identify the image data as containing a graphical code. The image data is then provided to a code reader 272, which extracts information from the graphical code. In the example shown in FIG. 2, the extracted information includes product information. Extracted product information may include a product ID, product description, ingredients, batch information, etc.

The video data can be sent along with product information (and potentially other information, such as a user ID, device ID, or the like) to a communication module 278 for subsequent formatting and transmission to the backend product computer system 102. (Other features of the client computing device 104 are not shown in FIG. 2 for ease of illustration. A description of illustrative computing devices is provided below with reference to FIG. 5.)

In an embodiment, the user interface 276 provides virtual "try on" functionality that allows the consumer to virtually apply the actual characteristics of that product, e.g., to an image of the user's face. The user interface 276 also may provide the ability to upload an image of the user's face for further analysis by the backend product computer system 102 (e.g., to provide recommendations based on the user's skin type). Product information and image data transmitted to the backend computer system 102 can be used to perform anonymous analytics to, e.g., monitor consumer satisfaction. Product information transmitted to the backend product computer system 102 may include the extracted product information, either alone or in combination with other information such as user preferences or selected variations for a particular product, which may be obtained via the user interface 276. Analytics (e.g., in combination with machine learning processes) can help to improve future recommendations for care routines as well as to provide customers with desirable products in terms of customized tints, textures, or other features.

Within components of the system 100, or by components of the system 100 working in combination, numerous technical benefits are achieved. For example, the ability to automatically recognize and quantify aspects of personal care routines overcomes technical limitations of previous automated consumer surveys, which provided some benefits of automation but relied on consumers to self-report their own routines, often with inaccurate results. Additional benefits may be realized by moving processing burdens (e.g., video analysis, object recognition, and the like) to the backend product computer system 102 (which may be a relatively high-powered and reliable computing system) from the client computing device 104, thus improving performance and preserving battery life for functionality provided by the client computing device 104.

Figure 3:
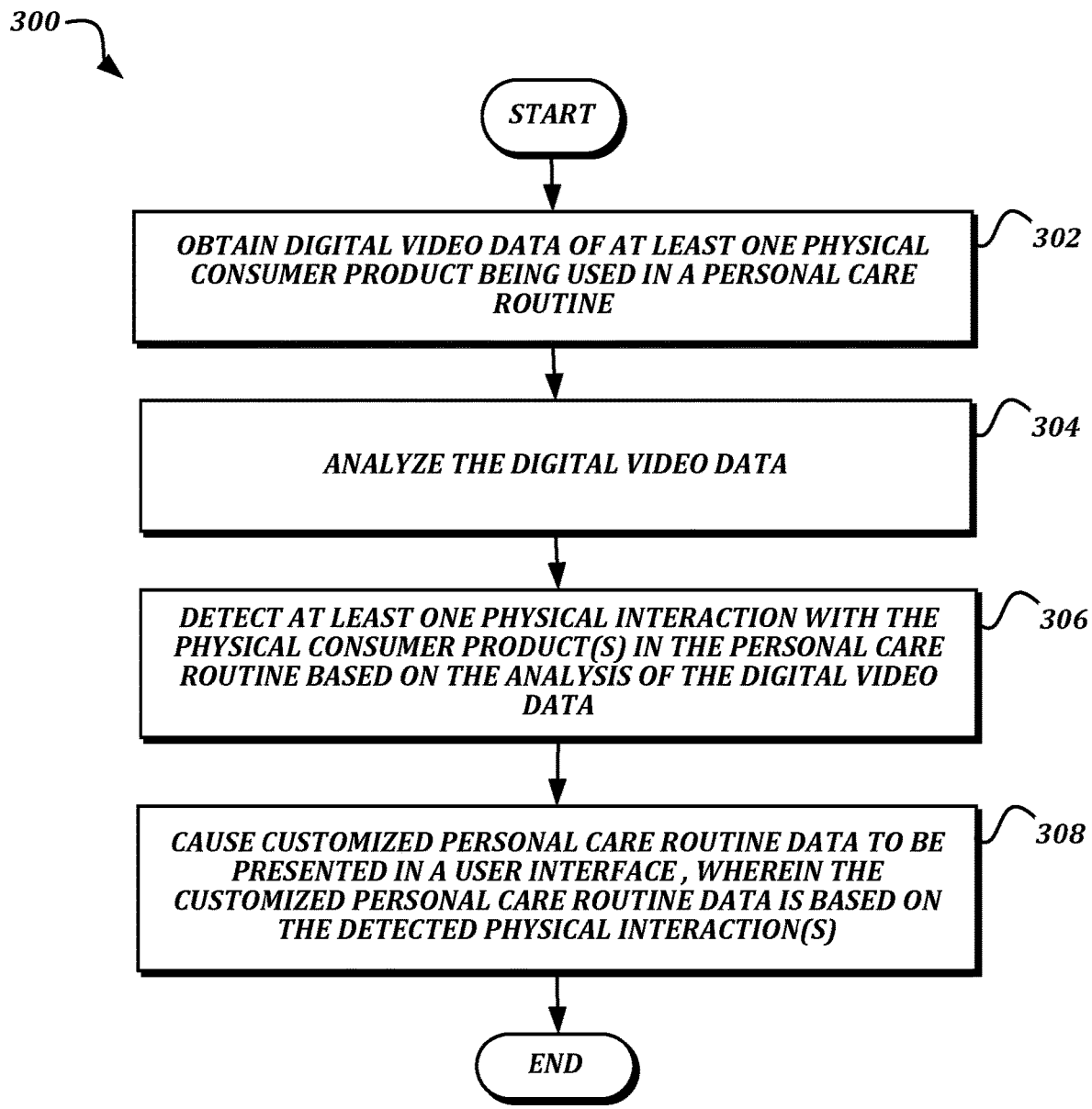
FIGS. 3 and 4 are flowcharts that illustrate example embodiments of methods according to various aspects of the present disclosure.

FIG. 3 is a flowchart that illustrates an example embodiment of a method 300 of providing customized personal care routine data for presentation in a user interface according to various aspects of the present disclosure. Though some embodiments of the method 300 may be used with any type of product, some embodiments of the method 300 are particularly suitable for cosmetics products as described herein.

From a start block, the method 300 proceeds to block 302, where a computer system (e.g., backend product computer system 102) obtains digital video data of at least one physical consumer product being used in a personal care routine. In an embodiment, the backend product computer system 102 receives the digital video data from a client computing device, such as a consumer's smartphone. The method proceeds to block 304, where the backend product computer system 102 analyzes the digital video data. The method proceeds to block 306, where the backend product computer system 102 detects at least one physical interaction with the at least one physical consumer product in the personal care routine based at least in part on the analysis of the digital video data. In an embodiment, the backend product computer system 102 employs one or more object recognition techniques described herein in analyzing the video data and detecting physical interactions with the product (e.g., applications of lipstick, foundation, eyeshadow, or the like). The method proceeds to block 308, where the backend product computer system 102 causes customized personal care routine data to be presented in a user interface. The customized personal care routine data is based on the detected physical interactions with the product.

In some embodiments of the methods described herein, the backend product computer system 102 generates the customized personal care routine data based at least in part on the at least one physical interaction and transmits the customized personal care routine data to a client computer system such as a smartphone, tablet computer, or the like. In response, the client computer system displays or otherwise presents the customized personal care routine data in a user interface.

Figure 4:
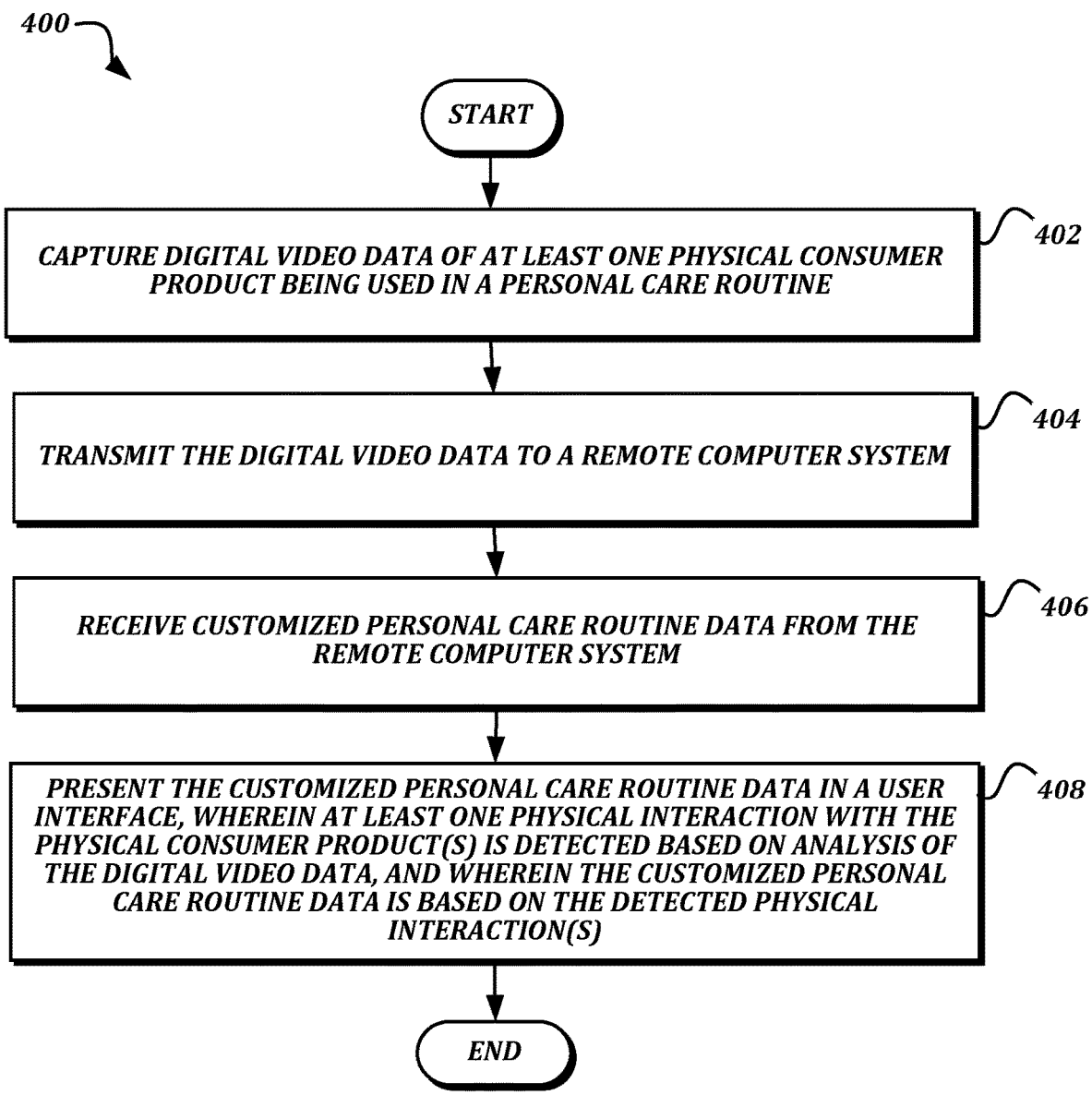

FIG. 4 is a flowchart that illustrates an example embodiment of a method 400 of presenting customized personal care routine data in a user interface of a client computer system (e.g., a consumer's smartphone or tablet computer) according to various aspects of the present disclosure. Though some embodiments of the method 400 may be used with any type of product, some embodiments of the method 400 are particularly suitable for cosmetics products as described herein.

From a start block, the method 400 proceeds to block 402, where the client computer system (e.g., client computing device 104) captures digital video data of at least one physical consumer product being used in a personal care routine. The method proceeds to block 404, where the client computing device 104 transmits the digital video data to a remote computer system (e.g., backend product computer system 102). The method proceeds to block 406, where the client computing device 104 receives customized personal care routine data from the backend product computer system 102. The method proceeds to block 408, where the client computing device 104 presents the customized personal care routine data in a user interface. At least one physical interaction with the product is detected by the backend product computer system 102 based at least in part on analysis of the digital video data. Alternatively, the analysis and detection can be performed by the client computing device, in which case the client computing device can generate or obtain the customized personal care routine data on its own, and the steps of transmitting and receiving data from the remote computer system can be omitted. The customized personal care routine data is based at least in part on the detected physical interaction(s).

In some embodiments of the methods described herein, the customized personal care routine data comprises a computer-animation simulation of a personal care routine. To generate the simulation, the backend product computer system 102 may represent the product as an object in a personal care routine simulation engine and represent the detected physical interaction as an interaction with the object in the personal care routine simulation engine, which can then be depicted in the simulation.

In some embodiments of the methods described herein, the backend product computer system 102 also obtains product information for the product, and the customized personal care routine data is further based on the product information. The product information may be transmitted to the backend product computer system 102 by a client computing device along with the video data.

In some embodiments of the methods described herein, the product information is initially obtained by the client computing device 104, such as by extracting the product information from a graphical code on the product, or obtaining the product information from the product via short-range radio-frequency communication (e.g., NFC or RFID communication).

In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

Figure 5:
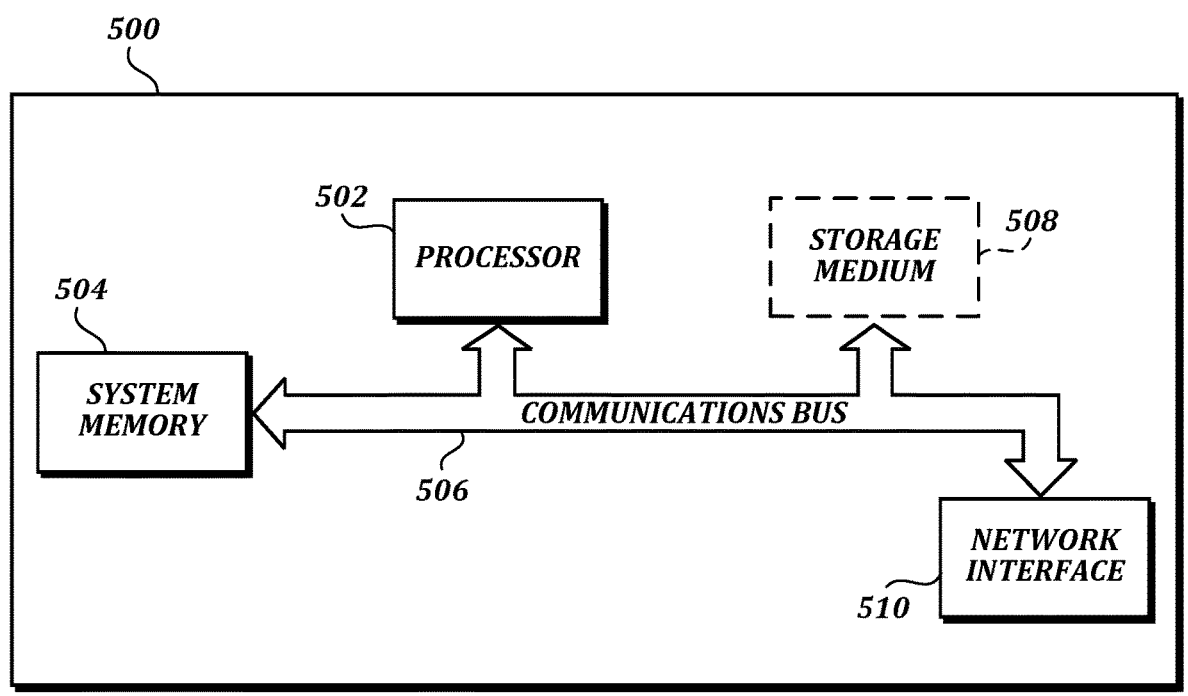
FIG. 5 is a block diagram that illustrates aspects of an exemplary computing device appropriate for use with embodiments of the present disclosure.

FIG. 5 is a block diagram that illustrates aspects of an exemplary computing device 500 appropriate for use with embodiments of the present disclosure. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, LTE, WiMAX, Bluetooth, and/or the like.

In the exemplary embodiment depicted in FIG. 5, the computing device 500 also includes a storage medium 508. However, services may be accessed using a computing device that does not include means for persisting data to a local storage medium. Therefore, the storage medium 508 depicted in FIG. 5 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 504 and storage medium 508 depicted in FIG. 5 are merely examples of computer-readable media. In an embodiment, computer-readable media can be used to store data for use by programs.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, USB, or other suitable connections protocols using wireless or physical connections. Similarly, the computing device 500 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The invention claimed is:

1. A computer-implemented method, comprising, by a computer system comprising one or more computing devices:
   obtaining digital video data of at least one physical consumer product being used in a first personal care routine;
   analyzing the digital video data using object recognition and gesture recognition;
   detecting at least one physical act of using the at least one physical consumer product in the first personal care routine based at least in part on the analysis of the digital video data;
   comparing the detected at least one physical act with at least one physical act in a second personal care routine;
   determining a recommended change to performance of the detected at least one physical act in the first personal care routine based at least in part on the comparing;
   generating customized personal care routine data comprising the recommended change to the performance of the detected at least one physical act in the first personal care routine; and
   causing the customized personal care routine data to be presented in a user interface.

2. The method of claim 1, wherein the at least one physical consumer product comprises two or more physical consumer products.

3. The method of claim 1 further comprising obtaining product information for the at least one physical consumer product, wherein the customized personal care routine data is further based on the product information.

4. The method of claim 3, wherein the product information is extracted from a graphical code on the at least one physical consumer product.

5. The method of claim 1, wherein causing the customized personal care routine data to be presented in the user interface comprises:
   transmitting the customized personal care routine data to a client computer system, wherein the user interface is implemented in the client computer system.

6. The method of claim 1 further comprising:
   representing the at least one physical consumer product as an object in a personal care routine simulation engine; and
   representing the detected at least one physical act of using the at least one physical consumer product as an interaction with the object in the personal care routine simulation engine.

7. The method of claim 6, wherein the customized personal care routine data further comprises a computer-animation simulation of a personal care routine generated by the personal care routine simulation engine.

8. The method of claim 1, wherein the at least one physical consumer product comprises a cosmetics product.

9. A computer system comprising:
   a camera;
   a processor; and
   computer-readable media having stored thereon instructions configured to cause the computer system to perform steps comprising:
      capturing digital video data of at least one physical consumer product being used in a first personal care routine;
      analyzing the digital video data using object recognition and gesture recognition;
      detecting at least one physical act of using the at least one physical consumer product in the first personal care routine based at least in part on the analysis of the digital video data;
      comparing the detected at least one physical act with at least one physical act in a second personal care routine;
      determining a recommended change to performance of the detected at least one physical act in the first personal care routine based at least in part on the comparing;
      obtaining customized personal care routine data comprising the recommended change to the performance of the detected at least one physical act in the first personal care routine; and presenting the customized personal care routine data in a user interface of the computer system.

10. The computer system of claim 9, wherein the at least one physical consumer product comprises two or more physical consumer products.

11. The computer system of claim 9, wherein the instructions are further configured to cause the computer system to capture a digital image of a graphical code on the at least one physical consumer product or obtain product information from the at least one physical consumer product via short-range radio-frequency communication.

12. The computer system of claim 9, wherein the customized personal care routine data further comprises a computer-animation simulation of a personal care routine.

13. The computer system of claim 9, wherein the customized personal care routine data further comprises a comparison with other users.

14. The computer system of claim 9, wherein the at least one physical consumer product comprises a cosmetics product.

15. The computer system of claim 9, wherein the computer system comprises a smartphone.

16. A non-transitory computer-readable medium having stored thereon instructions configured to, when executed by one or more computing devices of a computer system, cause the computer system to perform steps comprising:
    obtaining digital video data of a plurality of physical consumer products being used in a first personal care routine;
    analyzing the digital video data using object recognition and gesture recognition;
    detecting physical acts of using the plurality of physical consumer products in the first personal care routine based at least in part on the analysis of the digital video data;
    comparing the detected physical acts with a sequence of interactions in a second personal care routine;
    determining a recommended change to performance of the detected physical acts in the first personal care routine based at least in part on the comparing;
    generating customized personal care routine data comprising the recommended change to the performance of the detected physical acts in the first personal care routine; and
    transmitting the customized personal care routine data to a client computer system, thereby causing the customized personal care routine data to be presented in a user interface of the client computer system.

17. The computer-readable medium of claim 16, the steps further comprising obtaining product information for at least one of the plurality of physical consumer products, wherein the customized personal care routine data is further based on the product information.

18. The computer-readable medium of claim 16, wherein the recommended change to performance of the detected physical acts comprises a recommended change to the order of the detected physical acts.

19. The computer-readable medium of claim 16, wherein the recommended change to performance of the detected physical acts comprises a recommended change to a product being used in at least one of the detected physical acts.

* * * * *